(12) United States Patent
Perrot et al.

(10) Patent No.: US 10,009,572 B2
(45) Date of Patent: Jun. 26, 2018

(54) METHOD FOR ENHANCING MEDIA CONTENT OF A PICTURE

(71) Applicant: Prynt Corp., San Francisco, CA (US)

(72) Inventors: Clément Perrot, Paris (FR); Robin Barata, Paris (FR); David Zhang, Guyancourt (FR); Maxime Domain, San Francisco, CA (US); Marine Dunoguier, Figeac (FR)

(73) Assignee: Prynt Corp., San Francisco, CA (US)

( * ) Notice: Subject to any disclaimer, the term of this patent is extended or adjusted under 35 U.S.C. 154(b) by 0 days. days.

(21) Appl. No.: 15/332,971

(22) Filed: Oct. 24, 2016

(65) Prior Publication Data
US 2017/0041569 A1  Feb. 9, 2017

Related U.S. Application Data

(63) Continuation of application No. PCT/FR2015/051120, filed on Apr. 24, 2015.

(51) Int. Cl.
*H04N 5/77* (2006.01)
*G11B 27/34* (2006.01)
*H04N 9/82* (2006.01)

(52) U.S. Cl.
CPC ............ *H04N 5/772* (2013.01); *G11B 27/34* (2013.01); *H04N 9/8205* (2013.01)

(58) Field of Classification Search
CPC ..... H04N 5/772; H04N 5/23216; H04N 5/907
See application file for complete search history.

(56) References Cited

U.S. PATENT DOCUMENTS

| | | | |
|---|---|---|---|
| 8,498,451 B1* | 7/2013 | Agopian | H04M 1/27455 382/118 |
| 8,847,951 B1* | 9/2014 | Anguelov | G09G 5/377 345/419 |
| 2014/0178029 A1 | 6/2014 | Raheman et al. | |
| 2014/0226955 A1 | 8/2014 | Man | |
| 2014/0254934 A1 | 9/2014 | Laxminarayana Bhat et al. | |
| 2014/0286620 A1* | 9/2014 | Ueda | H04N 5/76 386/224 |

OTHER PUBLICATIONS

International Search Report and Written Opinion in PCT/IB2015/000786, dated Feb. 1, 2016 (10 pages).
Team Prynt—Kickstarter.com: "Prynt: the first instant camera case for iPhone and Android by Prynt—Kickstarter", https://www.kickstarter.com/projects/prynt/prynt-the-first-camera-case-for-iphone-and/posts/1138784, downloaded on Feb. 21, 2017.
Kyle Russell: "The Prynt Case Turns Your Smartphone Into a Polaroid Camera TechCrunch", Nov. 13, 2014, http://techcrunch.com/2014/11/13/the-prynt-case-turns-your-smartphone-into-a-polaroid-camera/, downloaded on Feb. 17, 2017.

* cited by examiner

*Primary Examiner* — Twyler Haskins
*Assistant Examiner* — Fayez Bhuiyan
(74) *Attorney, Agent, or Firm* — Mark H. Whittenberger; Holland & Knight LLP

(57) ABSTRACT

The present invention relates to a method for enhancing media content of a picture (303), wherein the method comprises:
filming a scene (102);
taking a picture of said scene (106);
storing said taken picture and a video (111), the taken picture being associated with said stored video.
Said stored video corresponds to a video captured during the filming of said scene, a start or an end of said stored video being function of a time when said picture is taken.

19 Claims, 3 Drawing Sheets

METHOD FOR ENHANCING MEDIA CONTENT OF A PICTURE

CROSS-REFERENCE TO RELATED APPLICATIONS

This application is a continuation and claims the benefit of International Patent Application Serial No. PCT/FR2015/051120, filed on Apr. 24, 2015 under 35 U.S.C. § 120, the disclosure of which is hereby incorporated by reference in its entirety.

BACKGROUND OF THE INVENTION

The present invention relates to the domain of capturing a picture, especially with a mobile terminal associated with a camera or any advanced camera with processing means.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

For now, when one wants to share a moment with friends or its family, he often takes its camera and chooses to capture this moment by taking a picture of by taking a short film: the user needs to choose between these two actions as the technologies used for these types of actions are very different.

Nevertheless, this decision is irreversible.

Thus, there is a need to introduce more flexibility in the creation of media contents.

SUMMARY OF THE INVENTION

The invention relates to a method for enhancing media content of a picture, wherein the method comprises:
 filming a scene;
 upon a reception an input of a user for taking a picture of said scene, taking the picture of said scene;
 storing said taken picture and a video, the taken picture being associated with said stored video.

Said stored video corresponds to a video captured during the filming of said scene, a start or an end of said stored video being function of a time when said picture is taken.

Thus, it is possible to enhance the media content associated with a given picture by associating to that picture, for instance, a short video of the scene prior to the moment the picture have been taken. The short video may have a start prior to that moment (e.g. 5 seconds before) and an end after that moment (e.g. 2 seconds after).

The filming of the video may be transparent for the user and thus easily enhance the media content without a specific manipulation of the user.

The storage of the picture and the video may be performed locally (e.g. on a smartphone) or after a transmission to a distant equipment (e.g. a server).

Taking a picture may be performed by clicking on a button/electronic button on a smartphone for instance, but it may also be performed by choosing/selecting a frame in a set of frames of a video: thus in these cases, the input is the click or the selection of the user.

In a possible embodiment, the method may further comprise:
during the filming of said scene, creating a plurality of successive temporary videos with last filmed events, said video being limited to a predetermined duration.

The stored video may thus be the last created temporary video.

Then, it is possible to dynamically crop the filmed media so that this temporary media is at most of a predetermined duration (e.g. 5 seconds). Thus the local memory is not filled with unneeded content especially if the user takes its time to take the picture.

In addition, the method may further comprise:
 after the picture is taken, cropping a temporary video created during the filming so that the cropped video is limited to a predetermined duration.

The stored video may be then the cropped video.

In this embodiment, the filmed media is cropped at the end of the process. It may enable the user to determine what video/picture he wants to store In a possible embodiment, the method may further comprise:
 identifying in a second picture/video a match for said taken picture;
 providing the video associated with said taken picture.

The identification may be performed thanks to an image recognition algorithm (for instance based on "points of interest" recognition).

The second picture/video may be received through the camera of a mobile terminal of a given user (i.e. scanning). The match may correspond to only a part of the second picture/video.

Thus, by "scanning" a printed picture with a mobile terminal, it is possible to retrieve the video associated with said picture and play it.

In order to ease the identification, it is possible to identify the edges (for instance delimited by a black line) of the printed picture in the second picture/video or any other forms that could characterized a printed picture (e.g. a logo, a OR code, a watermark, etc.).

In addition, the identification of the match may comprise:
 computing a first signature of the taken picture;
 computing a second signature of a subpart of the second picture/video;
 comparing the first and second signature.

The first signature may be computed when the taken picture is stored or may be computed on the fly when needed. The signature computed is function of the image recognition algorithm used.

The method may also further comprise:
 if a plurality of possible matches is identified, selecting, as the identified match, a match in said matches according to a criterion based on at least one of:
  a geographical information associated with each of the possible matches;
  a user identification information associated with each of the possible matches;
  a date/time information associated with each of the possible matches;
  a social network information associated with each of the possible matches;
  a rate information associated with each of the possible matches.

Therefore, it is possible to identify the most relevant match between all the identified matches.

The method may further comprise encrusting the provided video in the second image/video.

Thus, this encrustation is an intuitive way to display the retrieved video.

The end of said stored video may be the time when the picture is taken.

Thus, the stored video is a video of the events occurring just before the picture is taken: this video shows the contextual environment of the picture.

In addition, identifying in a second picture/video a match for said taken picture may comprise:
/i/ searching a local cache for said match;
/ii/ querying a distant server for returning said match.

Step /ii/ may be conditioned by the fact that search of step /i/ is unsuccessful. In another embodiment, steps /i/ and /ii/ may be performed in parallel.

Moreover, step /ii/ may further comprise:
receiving from the distant server a list of related pictures and updating the local cache with said related pictures.

Another aspect of the invention relates to a system for enhancing media content of a picture, the system comprising:
a mobile terminal comprising:
a camera for filming a scene;
a camera for taking a picture of said scene;
a storage media for storing said picture and a video, the picture being associated with said stored video.

Said stored video corresponds to a video captured during the filming of said scene, a start or an end of said video being function of a time when said picture is taken.

The camera for filming and the camera for taking the picture may be the same.

The storage media may be on a distant server distinct from the mobile terminal. Then, the mobile terminal and the distant server have communication units (i.e. interface such as WiFi, GSM and/or Ethernet communication module).

Thus the mobile terminal may also a processor to manage the filming, the taking of the picture, the storage and the picture and video manipulation.

A third aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
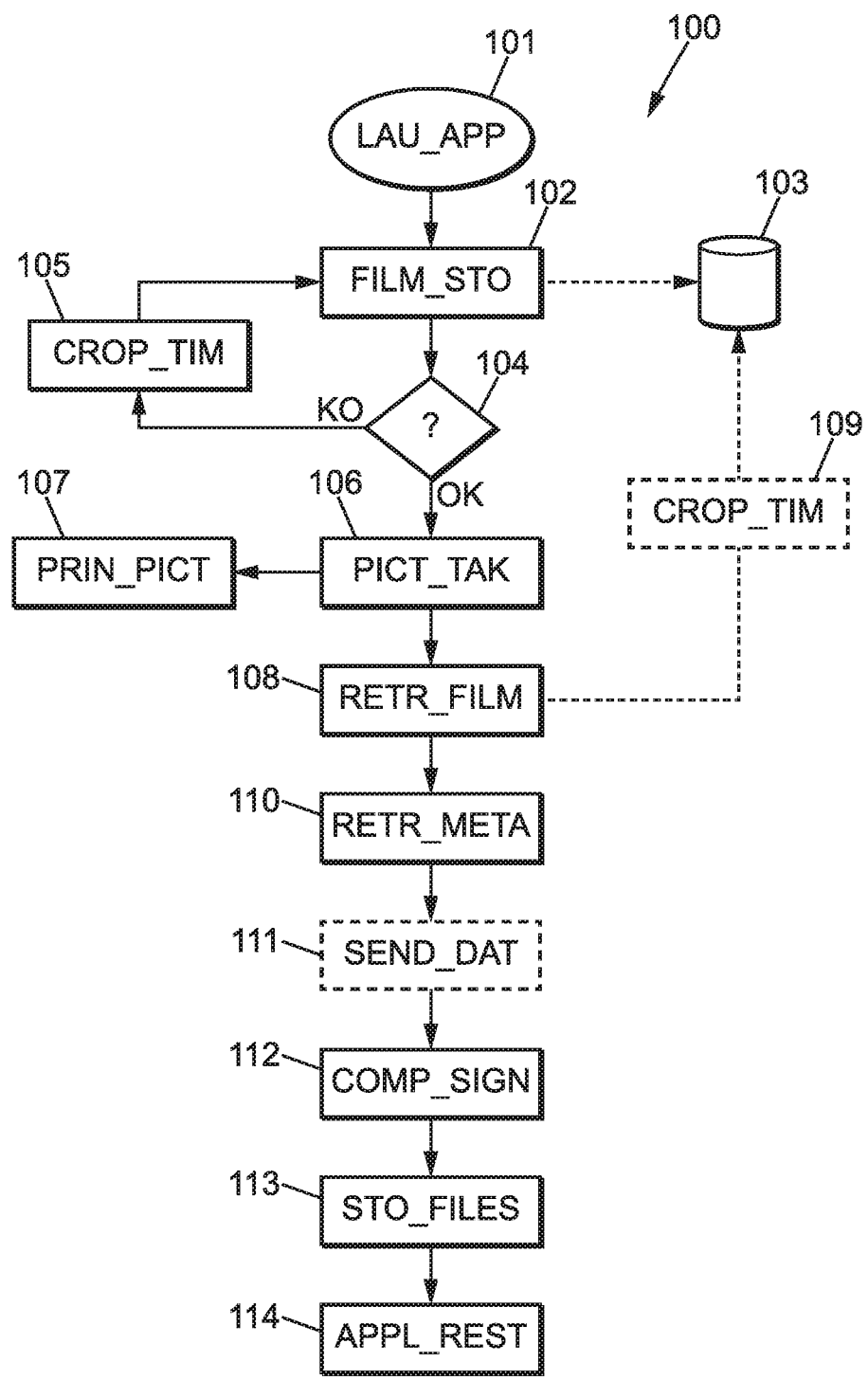
FIG. 1 is a flow chart describing a possible embodiment of the present invention when the picture is taken.

FIG. 1 is a flow chart describing a possible embodiment of the present invention when the picture is taken.

The following flow charts are described assuming that the invention is implemented into an application installed on a smartphone. Nevertheless, other embodiments may be possible.

When the application is launched (101) or when a given trigger is activated in the application, the camera of the smartphone is activated and the recording of a video is started (step 102).

Optionally, and during the recording, it is tested if the recorded video (that is temporarily stored on the memory 103 of the smartphone) has a length greater than a predetermined duration (e.g. 5 seconds). If its length is greater that this predetermined duration (test 104, output KO), the recorded video is cropped so that its duration is limited to the predetermined duration (step 105). Thus, only the last seconds of the recorded video is kept on the memory.

In one embodiment, when the application detects that a button is pressed by the user, a picture is taken (step 106) and the recording of the video ends. In a second embodiment, when the application detects that a button is pressed by the user, the recording of the video ends and the user is prompted to select in the frames of the recorded video the frame he wants to select for the picture. In the two possible embodiment described, it is also possible that the recording continues a couple of second after the user pressed the button.

Alternatively, the user may also select any picture from various sources (such as Facebook, Instagram, the camera roll of the mobile terminal, etc.) and select a corresponding video from various sources (for instance by filming a short video).

Once the picture is taken (or selected), it is possible to print the picture (step 107), for instance with a device attached to the smartphone as described in the application FR 15 50027.

Thus, the video is retrieved (step 108) from the memory 103 of the mobile terminal.

Optionally, if no cropping has been previously performed to limit the length of the recorded video in a previous step, and if this length is greater than a predetermined duration, the recorded video is now cropped so that its duration is limited to this predetermined duration (step 109).

In addition, it is also possible to collect (step 110) metadata related to the picture and video. For instance, these metadata may be:
a location of the mobile terminal when the picture is taken (through the GPS unit of the mobile terminal or through WiFi/GSM triangulation);
a date/time corresponding to the moment the picture is taken;
an id of the user currently logged on the application;
an id of the picture taken;
a comment inputted by the user;
an id of a filter applied on the taken picture;
a privacy setting;
information related to the source of the picture (e.g. camera roll, facebook, Instagram, camera, etc.)
etc.

Once the picture, the video and optionally the metadata identified, it is possible to transmit them to a distant server (step 111).

Optionally, it is also possible to compute (before or after step 111) a signature of the picture, signature which is computed for a given image recognition algorithm (e.g. Recognize.im, Pongr, Kooaba, Cortexika, Google Goggles, IQEngine, Moodstocks, Smartsy or Vuforia).

Then, the picture is stored on the memory/disk/database (e.g. the disk of the distant server) in association with the video, the metadata and the signature (if existing) (step 113).

It is finally possible to apply some restrictions (step 114) to the stored files to avoid these files being public. The restrictions may be for instance "accessible only by the user who took the picture", "accessible to the family members of the user who took the picture", "accessible to the friends of the user who took the picture", "accessible to the users within a predefined distance to the location where the picture have been taken", "accessible only for N views" (with N a predetermined number), etc.

Figure 2:
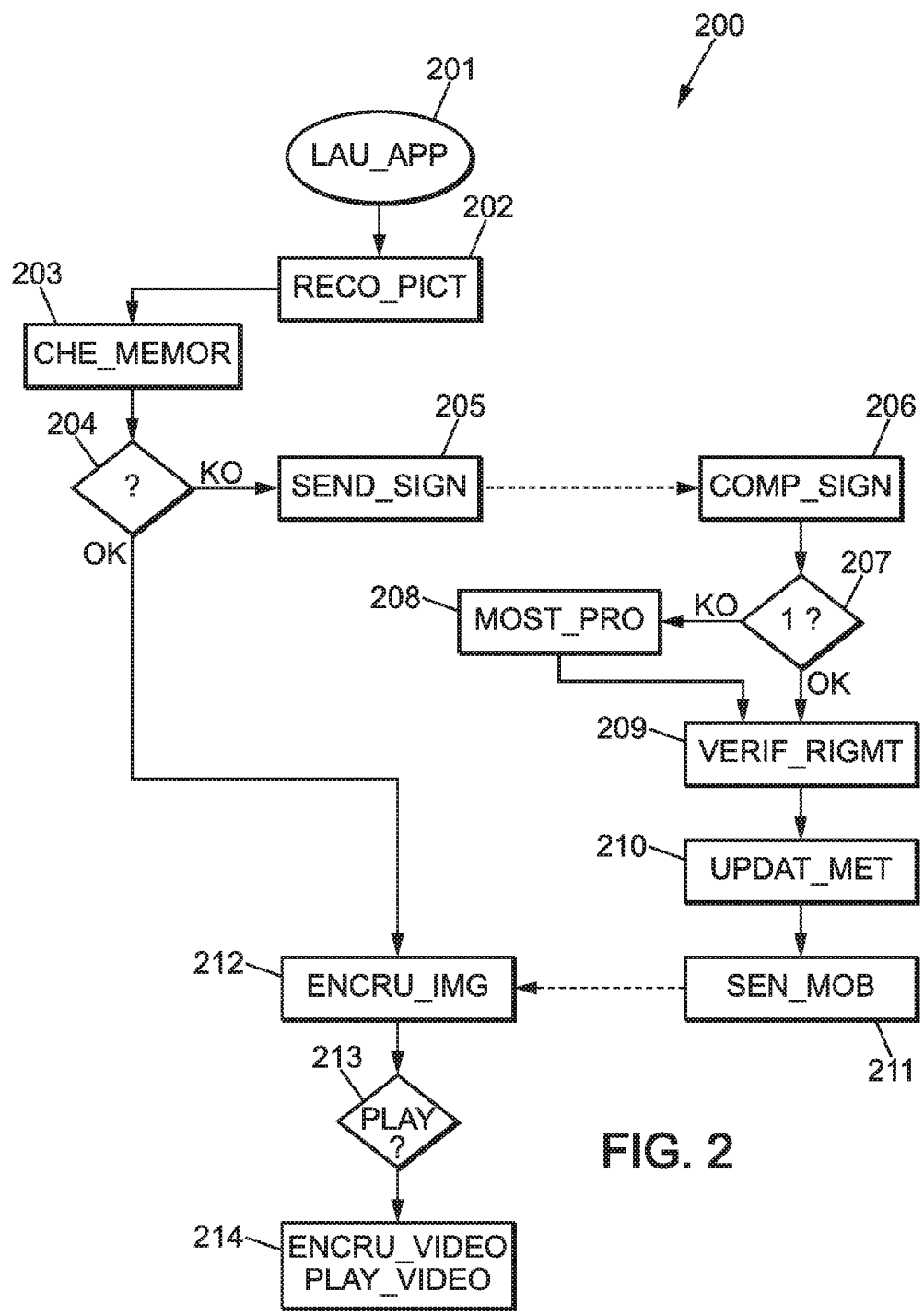
FIG. 2 is a representation of flow chart describing a possible embodiment of the present invention when the video is retrieved to be encrusted.

FIG. 2 is a representation of flow chart describing a possible embodiment of the present invention when the video is retrieved in order to be encrusted.

When the application is launched (201) or when a given trigger is activated in the application, the camera of the smartphone is activated and the captured image/video is dynamically analyzed (step 202) to detect a known image.

First, the local memory of the smartphone is analyzed to search for previous taken pictures from the application or other pictures in the memory of the phone (e.g. the camera roll) (step 203). A signature may be computed, if needed, in order to ease this search according to the image recognition algorithm used in reference of FIG. 1.

In order to ease the process, it is also possible (not shown on the figure) to pre-upload on the smartphone (i.e. in a local cache) some pictures (and the associated metadata/video) from a distant server (e.g. cloud servers), these pictures being identified as the most probable pictures the current user of the smartphone may scan. For instance, these pre-uploaded pictures may be the N last pictures that his friends (e.g. identified through a Facebook account) have taken (with N a predetermined number). Then, there is no need of an Internet connection to be able to scan a picture and to identify the associated video.

If the image recognition algorithm does not find any match in the local memory (test 204, output KO), the image or the computed signature of the image may be transmitted to the distant server (step 205). It is noted that steps 203 and 205 may be performed in parallel (i.e. without the test 204): the first returned result or the most accurate result is thus used.

Thus, the distant server may be able to determine if a picture matches the transmitted image or signature according to the image recognition algorithm (step 206).

If more than one picture match the transmitted image or signature (test 207, output KO), the most probable/relevant picture is selected. This selection may be for instance based on at least one of these criteria:
- the distance between the location information of the matching pictures (in the metadata, see above) and a location of the mobile terminal which is currently requesting the identification of the image/signature: for instance, the shorter the distance is, the more probable the picture may be;
- the distance between the date/time information of the matching pictures (in the metadata, see above) and current date/time: for instance, the shorter the distance is, the more probable the picture may be;
- the number of printing of the matching pictures;
- the relation between the users that have taken the matching pictures and the user which is currently requesting the identification of the image/signature (e.g. friends in Facebook, etc.);
- the rate of the matching pictures (i.e. the rate of correspondence between a picture and a signature);
- etc.

The selection may be a weighted function of various criteria.

If only one picture matches the transmitted image or signature (test 207, output OK), this picture is simply selected.

Then, once the picture is selected, the rights/restrictions apply to said picture are checked to ensure that the user requesting the picture is allowed (step 209) to retrieve said picture and the video associated to.

It is also possible to implement this step 209 in the selection described in step 208 to select the most probable/adequate picture that the user is allowed to retrieve.

It is also possible, optionally, to update the metadata associated with the selected picture (e.g. to update the number of views or the list of users having identified this selected picture, to update the list of image in which the selected picture have been identified, to update the list of location where the selected picture have been identified, to update the list of date/time when the selected picture have been identified) (step 210). In addition, the video associated to the selected picture may also be updated if, for instance, the current user requesting an identification of said picture is the user who originally took the picture.

Then, the video associated to the selected picture may be sent to the user (step 211). In addition, the selected picture and its associated signature may also be sent to the mobile terminal so that they can be stored in the local cache of the mobile terminal. This storing may ease a future recognition step (see above step 203).

In a possible embodiment, it is also possible to send other pictures (and their signatures) related to said selected picture to the mobile terminal so that they can be stored in the local cache of the mobile terminal. Said other pictures can be related to the selected picture because:
- they have been taken in the same location than the selected picture;
- they have been taken by the same user;
- they have been taken at the same date/time;
- etc.

Figure 3:
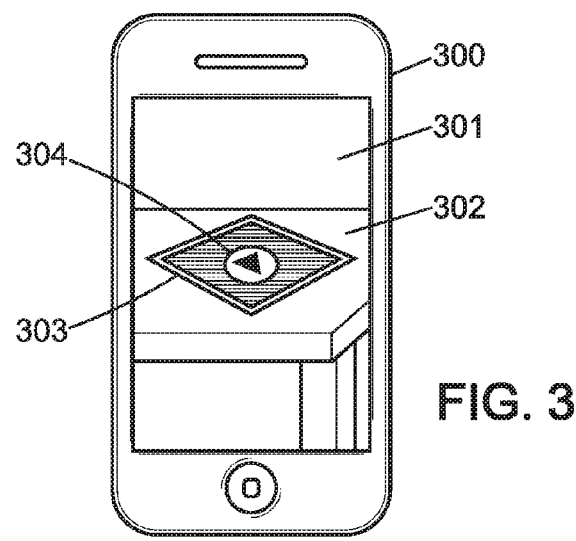
FIG. 3 is a representation of a mobile terminal with an encrustation of a video.

A preview of the sent video may then be inserted/encrusted (step 212) in the image 301 captured by the smartphone 300. For instance, in relation of FIG. 3 (which is a representation of a mobile terminal with an encrustation of a video), a printed image 303 lying on a table 302 has been captured, and has been recognized by the recognition image process and the smartphone has added a "play" button 304 on the printed image 303, so that the user may click on that button, and the preview of the sent video replaces the actual recognized image.

If the button 304 is pressed (step 213), the video is played (step 214) in the frame of the printed image with the deformation due to the perspective, encrusted/inserted in the frame of the printed image 303) or in "full screen" (at least on a rectangular zone of the screen of the smartphone, i.e., without perspective deformation).

Figure 4:
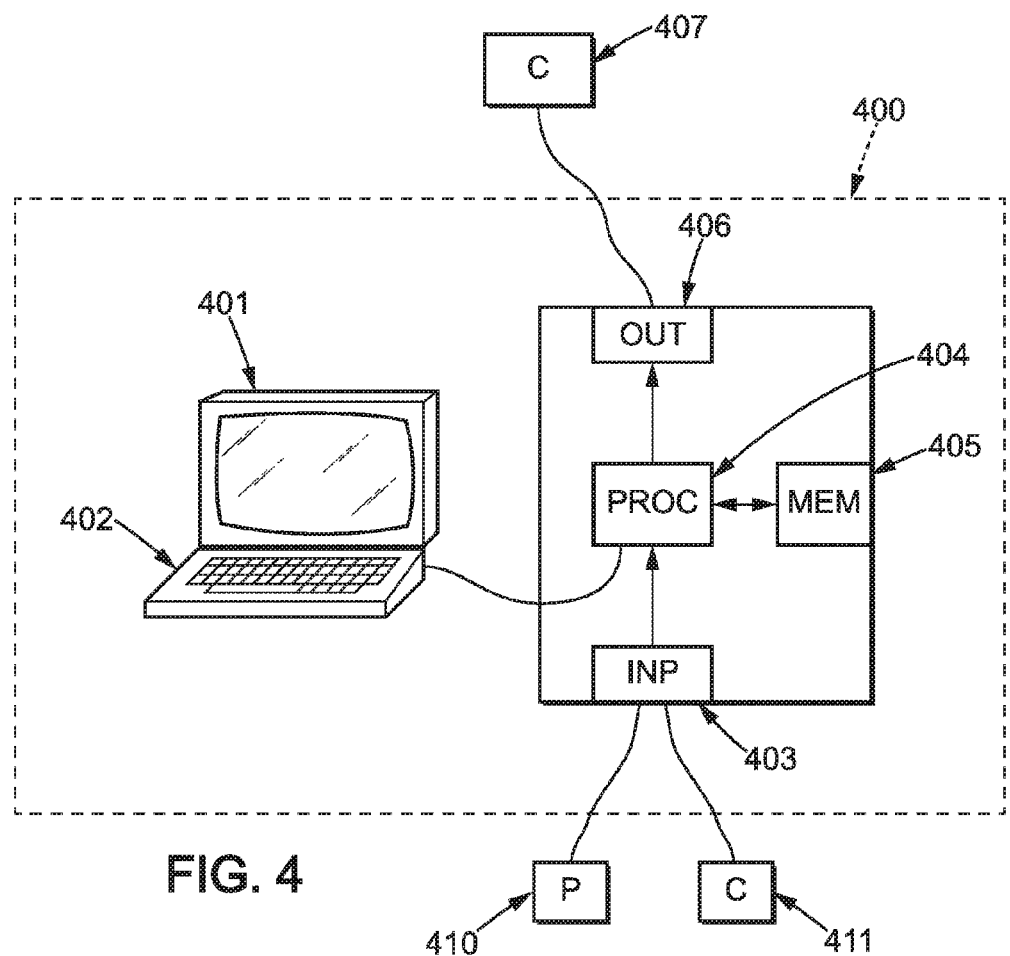
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for <<Field-Programmable Gate Array>>).

This computer comprises an input interface 403 for the reception of data used for the above method according to the invention (i.e. picture and video data from a camera 410 and other data from a receiving unit 411, such as a wireless communication unit) and an output interface 406 for connecting to a transmission unit 407. The receiving unit 411 and the transmission unit 407 can be merged into a single communication unit.

To ease the interaction with the computer, a screen 401 and a keyboard 402 may be provided and connected to the computer circuit 404.

The computer device may be miniaturized and the device may be a tablet and/or a mobile terminal such as a smartphone.

Part of the flow charts described in FIGS. 1 and 2 can represent steps of an example of a computer program which may be executed by the above mentioned device.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A computer-implemented method for enhancing media content of an image, the method comprising:
   recording a first video;
   associating a first image with the first video;
   capturing a second image of a physical print with a camera disposed in a mobile device, the second image encompassing the physical print of the first image, the physical print comprising edges defining a frame;
   displaying the second image on a display screen of the mobile device;
   playing the first video within the frame in the second image; and
   during the recording of the first video, creating a plurality of successive second videos, each second video having a predetermined duration, wherein the first video is a last created second video.

2. The method of claim 1, wherein associating the first image with the first video comprises:
   computing a first signature of the first image;
   computing a second signature of the second image; and
   comparing the first and second signatures.

3. The method of claim 1, wherein associating the first image with the first video comprises:
   identifying a plurality of possible matches between a signature of the second image and signatures for a plurality of images comprising the first image; and
   selecting the first image from the plurality of possible matches based on at least one of:
      geographical information associated with each of the possible matches;
      user identification information associated with each of the possible matches; date/time information associated with each of the possible matches;
      social network information associated with each of the possible matches;
      and rate information associated with each of the possible matches.

4. The method of claim 1, wherein playing the first video comprises receiving an instruction to play the first video.

5. The method of claim 1, wherein at least one of a beginning and an end of the first video corresponds to a time when user input was received to capture the first image.

6. The method of claim 1, wherein associating the first image with the first video comprises at least one of:
   (i) searching a local cache for the first image; and
   (ii) querying a server for returning at least one of the first image and the first video.

7. The method according claim 6, wherein step (ii) further comprises:
   receiving from the server a list of related images and updating the local cache with the related images.

8. A system for enhancing media content of an image, the system comprising:
   a computer programmed to perform operations comprising:
      recording a first video;
      associating a first image with the first video;
      capturing a second image of a physical print with a camera disposed in a mobile device, the second image encompassing the physical print of the first image, the physical print comprising edges defining a frame;
      displaying the second image on a display screen of the mobile device;
      playing the first video within the frame in the second image; and
      during the recording of the first video, creating a plurality of successive second videos, each second video having a predetermined duration, wherein the first video is a last created second video.

9. A non-transitory computer readable storage medium, having stored thereon a computer program comprising program instructions that, when executed by a computer, cause the computer to perform operations comprising:
   recording a first video;
   associating a first image with a first video;
   capturing a second image of a physical print with a camera disposed in a mobile device, the second image encompassing the physical print of the first image, the physical print comprising edges defining a frame;
   displaying the second image on a display screen of the mobile device;
   playing the first video within the frame in the second image; and
   during the recording of the first video, creating a plurality of successive second videos, each second video having a predetermined duration, wherein the first video is a last created second video.

10. The system of claim 8, wherein associating the first image with the first video comprises:
   computing a first signature of the first image;
   computing a second signature of the second image; and
   comparing the first and second signatures.

11. The system of claim 8, wherein associating the first image with the first video comprises:
   identifying a plurality of possible matches between a signature of the second image and signatures for a plurality of images comprising the first image; and
   selecting the first image from the plurality of possible matches based on at least one of:
   geographical information associated with each of the possible matches;
   user identification information associated with each of the possible matches;
   date/time information associated with each of the possible matches;
   social network information associated with each of the possible matches; and
   rate information associated with each of the possible matches.

12. The system of claim 8, wherein playing the first video comprises receiving an instruction to play the first video.

13. The system of claim 8 wherein at least one of a beginning and an end of the first video corresponds to a time when user input was received to capture the first image.

14. The system of claim 8, wherein associating the first image with the first video comprises at least one of:
   (i) searching a local cache for the first image; and
   (ii) querying a server for returning at least one of the first image and the first video.

15. The system according claim 14, wherein step (ii) further comprises:
   receiving from the server a list of related images and updating the local cache with the related images.

16. The method of claim 1, wherein at least one frame of the first video corresponds to the first image.

17. The method of claim 1, wherein playing the first video comprises deforming the first video according to a perspective of the print in the second image.

18. The system of claim 8, wherein at least one frame of the first video corresponds to the first image.

19. The system of claim 8, wherein playing the first video comprises deforming the first video according to a perspective of the print in the second image.

* * * * *